United States Patent Office 3,433,360
Patented Mar. 18, 1969

3,433,360
FILTERING APPARATUS
Ladislav Duchek and Jan Hasenohrl, Plzen, Czechoslovakia, assignors to Ceskoslovenska Akademie Ved, Prague, Czechoslovakia
Filed June 23, 1967, Ser. No. 648,284
U.S. Cl. 210—249
Int. Cl. B01d 25/06
10 Claims

ABSTRACT OF THE DISCLOSURE

A housing having a wall provided with a bottom portion. Load-receiving support means engages the bottom portion from the outside of the housing. At least one relatively heavy vessel is received within the housing and so arranged that its weight is transferred through the bottom portion to the load-receiving support means.

Background of the invention

The present invention relates to mounting arrangements in general, and more particularly to mounting arrangements wherein one vessel is supported within at least one other vessel. Specifically, the invention relates to mounting of the vessels of sludge blanket clarifiers.

It is known to construct water clarifiers, such as are used in the treatment of waste water, by disposing the actual clarifying arrangement and a filter of particulate material for final purification of the treated water, in a common tank. This tank may be of various configuration, i.e. polygonal, cylindrical, or spherical and may be made of metal, concrete or other materials, even plastics.

One well-known and highly efficient type of clarifier is the so-called "sludge blanket clarifier," in which a blanket or layer of sludge is maintained floating on the waste water which latter, in bubbling up through this blanket, is purified because its contents of solid contaminants are retained in the floating blanket. Clarifiers of this type are known and their operating principle need therefore not be discussed.

A particularly effective clarifier of this type utilizes a fully floating sludge blanket, and the water is subjected to a final filtration in a filter of particulate material after preliminary filtration during passage through the sludge blanket. This arrangement comprises an outer tank, for instance of spherical configuration, within which there is mounted a cylindrical vessel whose upper end is located at the top of the outer tank while its lower end rests on the bottom of the outer tank. The upper portion of this vessel defines within itself an expansion space, and located below this space is an area filled with a so-called "solid" filter, that is a filter of such particulate material as sand. Below this, again, there is a coagulation area wherein untreated water containing chemical additives is introduced, and wherein impurities are occluded by floc particles.

A further vessel, generally of upwardly open funnel-shape, surrounds the cylindrical vessel and also rests on the bottom of the common tank. The funnel-shaped vessel defines with the cylindrical vessel the area within which the floating sludge blanket finish, it being understood that the bottom part of the cylindrical vessel is provided with a suitable opening or openings communicating with the space surrounded by the funnel-shaped vessel so that the water with the admixed chemical additives can flow into this space and through the sludge blanket floating therein.

A disadvantage of clarifiers arranged in such a manner is the direct transfer of weight of the funnel-shaped vessel containing the sludge blanket, and especially of the cylindrical vessel containing the sand filter upon the bottom of the tank. The sand filter constitutes the major portion of the entire weight of the combined clarifier. This factor influences the construction of the clarifier from the point of view of strength and requires consequently a reinforced construction of the whole clarifier. The result is a considerable increase in weight of the clarifier, accompanied by a need for more materials and an increase of costs.

Summary of the invention

The afore-described drawbacks are eliminated by mounting filtration vessels of sludge blanket water clarifiers in accordance with this invention.

Briefly stated, one feature of our invention resides in a mounting arrangement, particularly for use in sludge blanket clarifiers, comprising a housing having a peripheral wall including a bottom wall portion; load-receiving means engaging a part of the bottom wall portion exteriorly of the housing; and at least one relatively heavy vessel received within said housing and so supported on the bottom wall portion that the weight of the vessel is borne by the load-receiving means, whereby the transmission to the peripheral wall of stresses resulting from the weight of the vessel is substantially precluded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Description of the preferred embodiments

Figure 1:
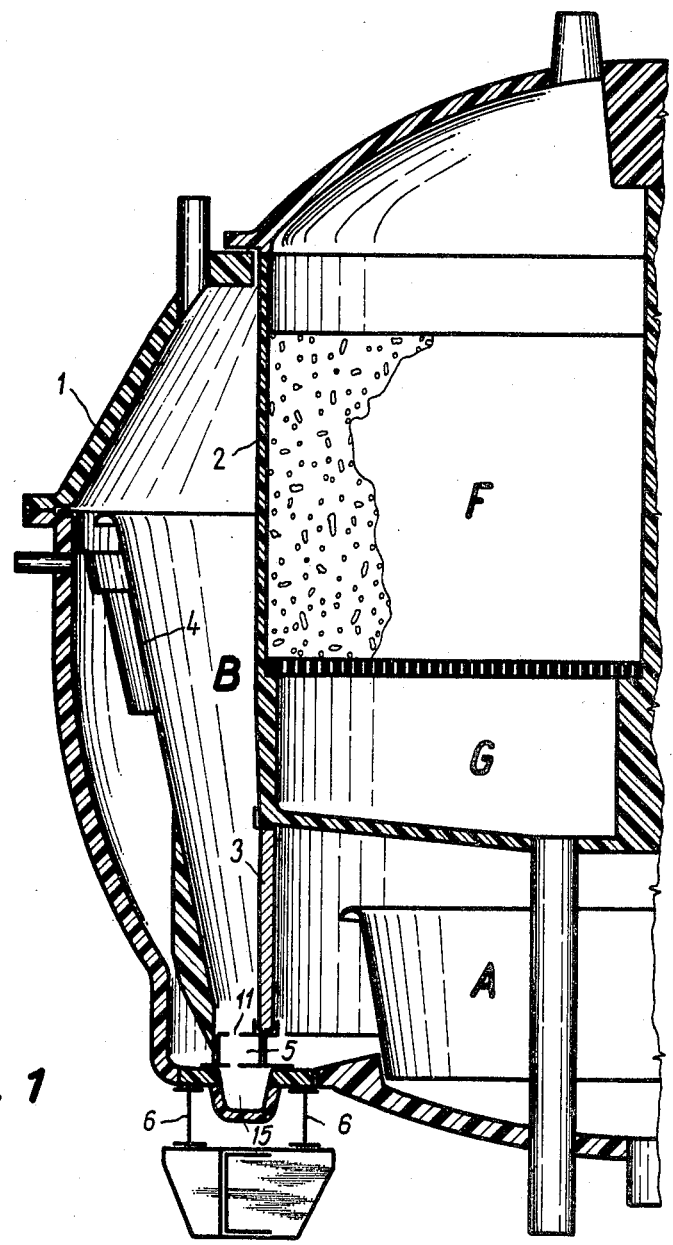
FIG. 1 is a vertical sectional view of a clarifier embodying the invention.
Figure 2:
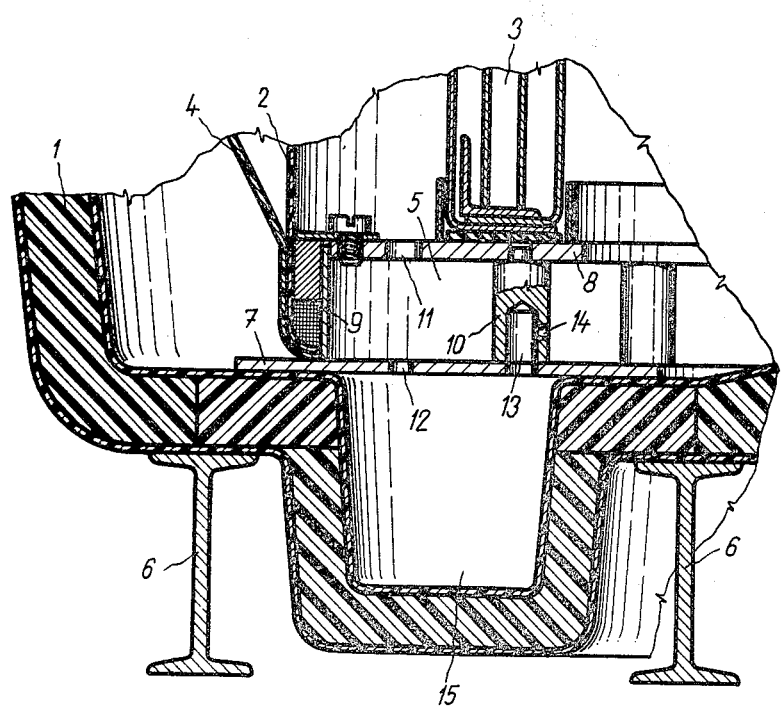
FIG. 2 is a detailed view of the embodiment shown in FIG. 1.

In FIG. 1 a globular tank 1 is shown which may consist of different material but is illustrated as being of plastic, and in the middle of which is located a cylindrical vessel 2 containing a solid filter body F of sand or other particulate material. Below the filter there is a distribution area G for filtered water. The vessel 2 rests upon a cylindrical ring 3 which defines the coagulation zone A wherein floccules are formed. Round the cylindrical vessel, there is disposed a funnel-shaped vessel or receptacle 4 widening in the upward direction and defining with the vessel 2 the sludge blanket area B. Both the funnel-shaped vessel 4 and the cylindrical ring 3 rest with their lower ends on a supporting ring 5 which is supported in turn, upon the bottom of the globular tank 1, the latter being exteriorly engaged in that region by a load-receiving frame 6. The supporting ring 5 consists of a larger lower ring 7 and a smaller upper ring 8. The upper ring 8 comprises either a draining slot 11 or other equivalent orifices, while the lower ring 7 comprises either a rinsing slot 12 or equivalent orifices. The funnel-shaped vessel 4 is seated on the lower ring 7 and sustained by a web 9, which supports the upper ring 8. On the upper ring is seated the cylindrical ring 3. In this region the upper ring 8 is supported by legs or spacers 10 between which water from the coagulation zone A flows into the space between the upper and lower rings 7, 8 and to pass therefrom through the draining slot 11 into the sludge blanket zone B. A vertical orifice 13 is bored through the lower ring 7 and into the illustrated leg 10. Moreover, this leg 10 also comprises two radial openings 14 which communicate with the vertical orifice 13. The lower ring simultaneously overlies and closes the channel 15 in such a way that a rinsing tube is formed into which water under pressure is pumped after the clarifier has been in operation for a predetemined period of time. This water penetrates through the rinsing slot 12 and cleans the draining slot 11. Furthermore, the water under pressure enters the vertical opening 13 from which it flows through the radial orifices 14 to thereby rinse the coagulation zone A and wash it clean. It should be noted here that the bottom of the globular tank 1 is close under the lower end of the ring 7, and this bottom is stiffened by the supporting frame 6 so that the load of the two vessels 2 and 4 of the liquid in these vessels, and of the filter material is transmitted not to the bottom of tank 1, but rather through it as an intermediary to the load-receiving frame 6. It is clear that under these circumstances neither the bottom nor the remainder of the wall of tank 1 need be dimensioned so strongly as to bear the funnel-shaped vessel 4 and the weight of the solid filter F. Consequently, the supporting ring 5 answers a double purpose: *firstly*, it is a structural supporting element transferring the weight of the funnel-shaped vessel 4, the cylindrical vessel 2 and their contents to the supporting frame 6, and *secondly*, it is a functional element allowing the water to flow from the coagulation area A into the filtration area B and making possible the rinsing of the draining slot 11 as well as the coagulating area A.

Thus as mentioned above, the weight of the inner components and contents of the clarifier is transferred to the load-receiving supporting frame located underneath the tank and the construction of the tank is therefore not stressed by weight and may be simpler and lighter than heretofore possible.

It will be understood that each of the elements described above, or two or more together, may also find a useful application in other types of arrangements differing from the types described above.

While the invention has been illustrated and described as embodied in a mounting arrangement, it is not intended to be limited to the details shown, since various modifications and structural changes may be made without departing in any way from the spirit of the present invention.

What is claimed as new and desired to be protected by Letters Patent is set forth in the appended claims.

What is claimed is:

1. In a clarifier, a combination comprising a housing having a peripheral wall including a bottom wall portion; load-bearing means engaging a part of said bottom wall portion exteriorly of said housing and stress-receiving means engaging a part of said bottom wall portion interiorly of said housing; at least one relatively heavy vessel received with clearance in said housing and so supported on said stress-receiving means interiorly of said housing that the weight of said vessel is borne by said stress-receiving means interiorly and transmitted to said load-bearing means exteriorly of said housing with the transmission of stresses to said peripheral wall being substantially precluded; filter means in said vessel; inlet means and outlet means respectively communicating with the interior and exterior of said vessel; and passage means communicating with the interior and exterior of said vessel.

2. A clarifier as defined in claim 1, said vessel being substantially cylindrical; and further comprising a substantially funnel-shaped receptacle surrounding said vessel in said housing and defining a clearance therewith, said passage means communicating with said clearance.

3. A clarifier as defined in claim 2, wherein said stress-transmitting means comprise an annular element having opposite axial end faces respectively engaging said bottom wall portion and a bottom portion of said vessel.

4. A clarifier as defined in claim 3, wherein said annular element comprises a pair of ring members, and connecting means connecting said ring members in axially spaced relationship with one another.

5. A clarifier as defined in claim 4, wherein one of said ring members engages said bottom wall portion and is of a predetermined diameter, and wherein the other of said ring members engages said bottom portion of said vessel and is of a diameter smaller than said predetermined diameter.

6. A clarifier as defined in claim 5, said receptacle having a lower end portion engaging and supported by said one ring member.

7. A clarifier as defined in claim 6, further comprising peripheral wall means extending between said ring members and defining an enclosed space therewith; said passage means being provided in said ring members and communicating with said enclosed space and with the clearance between said receptacle and said vessel.

8. A clarifier as defined in claim 7, wherein said bottom wall portion is provided in an inner surface thereof with an elongated groove connectable to a source of fluid, said one ring member overlying said groove and defining a channel therewith; and wherein said passage means also communicates with said channel so that the latter is connected with said enclosed space and said clearance.

9. A clarifier as defined in claim 1, wherein at least said peripheral wall consists at least in part of synthetic plastic material.

10. A clarifier as defined in claim 1, said filter means including a body of particulate material received in said vessel.

References Cited

UNITED STATES PATENTS 2,948,400  8/1960  Hagen _____ 210—256
3,298,526  1/1967  Valdespino et al. __ 210—207 X

OTHER REFERENCES

German printed application 1,156,823, November 7, 1963, 1 sht. dwg., 2 pp. spec. 210—256.

REUBEN FRIEDMAN, *Primary Examiner.*

J. L. DE CESARE, *Assistant Examiner.*

U.S. Cl. X.R.

210—256, 265